United States Patent
Li et al.

(10) Patent No.: US 7,715,598 B2
(45) Date of Patent: May 11, 2010

(54) METHOD FOR DETECTING FACIAL EXPRESSIONS OF A PORTRAIT PHOTO BY AN IMAGE CAPTURING ELECTRONIC DEVICE

(75) Inventors: Shu Li, Hangzhou (CN); Jin Wang, Hangzhou (CN)

(73) Assignee: Arsoft, Inc., Fremont, CA (US)

( * ) Notice: Subject to any disclaimer, the term of this patent is extended or adjusted under 35 U.S.C. 154(b) by 959 days.

(21) Appl. No.: 11/492,076

(22) Filed: Jul. 25, 2006

(65) Prior Publication Data
US 2008/0025576 A1    Jan. 31, 2008

(51) Int. Cl.
G06K 9/00    (2006.01)

(52) U.S. Cl. .................. 382/118; 382/159; 382/298; 348/E5.042

(58) Field of Classification Search .......... 382/118, 382/159, 298; 348/E5.042
See application file for complete search history.

(56) References Cited

U.S. PATENT DOCUMENTS

| | | | |
|---|---|---|---|
| 6,879,709 B2* | 4/2005 | Tian et al. | 382/118 |
| 7,027,621 B1* | 4/2006 | Prokoski | 382/118 |
| 7,428,001 B2* | 9/2008 | Schowengerdt et al. | 348/51 |
| 2006/0115157 A1* | 6/2006 | Mori et al. | 382/190 |
| 2007/0025722 A1* | 2/2007 | Matsugu et al. | 396/263 |

* cited by examiner

*Primary Examiner*—Bhavesh M Mehta
*Assistant Examiner*—Stephen R Koziol
(74) *Attorney, Agent, or Firm*—Bacon & Thomas, PLLC

(57) ABSTRACT

In a method for detecting facial expressions of a portrait photo by an image capturing electronic device, a face captured in the portrait photo is detected. The position and range of the opened and closed facial features are detected, and the facial features within an identified range are magnified according to a specific proportion. A patch of facial features and their surroundings within a specific range is cut according to the magnified identified range, so that the patch can show a change of facial expressions and a specific range of their surroundings. A facial feature classifier is trained by a specific number of opened and closed facial feature samples based on the Adaboost algorithm and used for detecting the facial features in the patch to determine whether the facial feature is situated at an opened state or a closed state.

5 Claims, 5 Drawing Sheets

METHOD FOR DETECTING FACIAL EXPRESSIONS OF A PORTRAIT PHOTO BY AN IMAGE CAPTURING ELECTRONIC DEVICE

FIELD OF THE INVENTION

The present invention relates to a detecting method of an image capturing electronic device, and more particularly to a method for detecting facial expressions of a portrait photo, determining whether facial features of eyes and mouth of a photographed person are situated at an opened state or a closed state and issuing a warning signal for a photographer to determine whether taking pictures or not.

BACKGROUND OF THE INVENTION

As the digital camera technology advances rapidly in recent years, various electronic devices (such as digital cameras, camcorders, notebook computers and mobile phones, etc) with an image capturing device are introduced constantly to the market. Not only the quality becomes increasingly higher, but the volume of products also becomes increasingly smaller, and their market price becomes lower gradually. These electronic image capturing devices available in the market become popular, and thus finding a way of designing an electronic device having a smart image capturing function to meet the image capturing requirements of the extensive consumers and compensate their deficient photographic skills is an important subject for electronic image capturing device designers and manufacturers to study and provide feasible solutions.

A portrait photo is the most popular type of photos taken by a traditional electronic image capturing device by consumers. When a portrait photo is taken, a series of searches is performed to capture the most appropriate transient scene, so that the portrait photo taken shows the best appearance of the photographed person. What is the best acceptable appearance recognized by a vast majority of consumers? Perhaps, the answer is an appearance of a photographed person with a smile face and opened eyes. Therefore, we usually expect a photographer to take our portrait photo at the moment when we are showing a smile face. Unfortunately, the photographed person does not know the exact time when the photographer presses the shutter due to a lack of communication or unspoken consensus and thus they usually close their eyes or mouth unintentionally while the photographer is taking their portrait. Even worse, the facial expression becomes unnatural or stiffed when the photographed person is told to maintain a smile face for a long time, but the person cannot keep still so long. Sometimes, the photographed persons may show a serious facial expression or blink their eyes after such a long smile while the photographer is taking the picture. Such unexpected situation gives rise to a portrait of a person with unnatural and stiff facial expressions, which is unsatisfactory or unacceptable to most photographed persons.

SUMMARY OF THE INVENTION

In view of the foregoing shortcomings of the prior art, the inventor of the present invention based on years of experience to conduct extensive researches and experiments and finally invented a method for detecting facial expressions of a portrait photo by an image capturing electronic device.

Therefore, it is a primary objective of the present invention to overcome the foregoing shortcomings by providing a method for detecting facial expressions of a portrait photo by an image capturing electronic device in accordance with the present invention. The method is applied to an electronic image capturing device, such that the electronic image capturing device detects a face in a captured portrait photo. After the position and range of the face are detected, the position and range of opened and closed facial features such as eyes and mouth of a face are detected, and the positions of the facial features within an identified range are magnified according to a specific proportion (such as 1.5 times of the original length and width). A patch of facial features and their surroundings within a specific range is cut according to the magnified identified range, so that the patch can show a change of facial expressions and a specific range of their surroundings. Now, a facial feature classifier such as a classifier trained by a specific number of opened and closed facial feature samples based on the Adaboost algorithm is used for detecting an opened state or a closed state of the facial feature in the patch to determine whether the facial feature is situated at an opened state or a closed state.

Another objective of the present invention is to issue a warning signal if the facial features in the patch are situated at a closed state and notice a user of the electronic image capturing device that the facial features of a photographed person are not ready for taking pictures yet. For instance, the eyes and mouth of the photographed person are closed unnaturally or the facial expression is stiff.

Another objective of the present invention is to permit a user to press a shutter of the electronic image capturing device to capture a portrait photo when the facial features in the patch are determined to be situated at an opened state and the facial expressions (such as a smile face with eyes and mouth opened) of the photographed person are ready for taking pictures, and then save the pictures into a memory or a storage device of the electronic image capturing device, so as to assure the facial expressions of the captured portrait and maintain the best appearance status.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
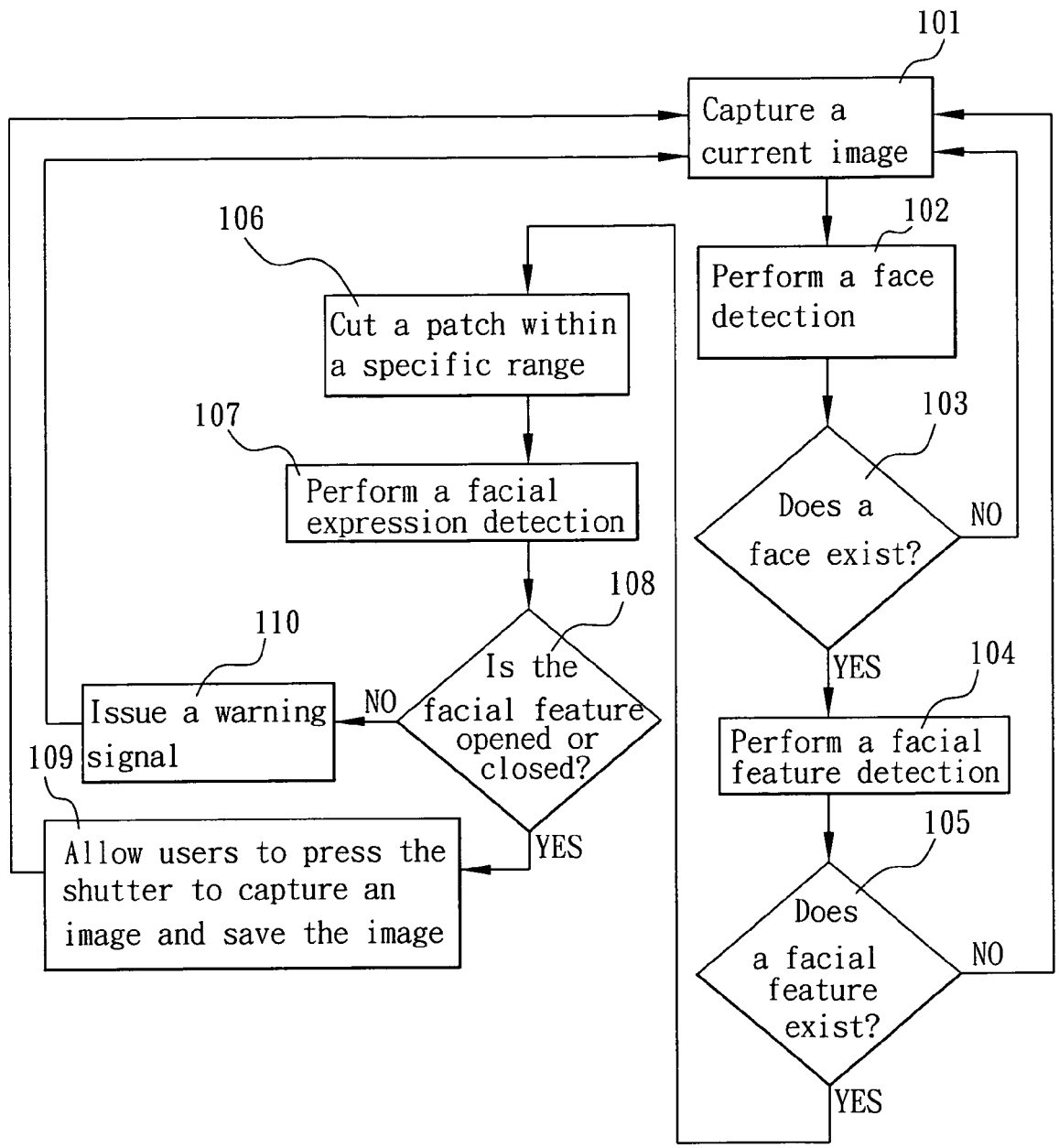
FIG. 1 is a flow chart of a method for detecting a facial expression of a portrait photo by an electronic image capturing device according to the present invention.

The present invention discloses a method for detecting facial expressions of a portrait photo by an image capturing electronic device, and the method is applied to an electronic image capturing device, and the electronic image capturing device could be any electronic devices such as digital cameras, digital camcorders, notebook computers or mobile phones having a digital image capturing device (such as a CCD or CMOS image component). The electronic image capturing device as shown in FIG. 1 will carry out the procedure according to the method of the present invention as follows.

(Step 101) Capture a current image by a digital image capturing device.

(Step 102) Perform a face detection for the image by a traditional computing algorithm such as the OpenCV face detection software designed with the Adaboost computation, the Haar-like feature and related identification technology disclosed in published journals. The detection software includes a face classifier (which determines whether or not an image is a human face) trained by a specific quantity of face image samples for quickly detecting and identifying a face in the image. The detection algorithm is a prior art, and thus will not be described in detail here.

(Step 103) Determine whether or not a face exists in the image; if yes, process Step 104, or else return to Step 101 to capture a current image by the digital image capturing device again.

(Step 104) After the position and range of a face on the image are marked, the position and range of the facial features including opened eyes and mouth of a face are detected, wherein the detection algorithm has been disclosed in published journals. A facial feature classifier is trained by a specific number of feature image samples, and the facial feature classifier is used for determining whether or not an image is a facial feature. The classifier is a prior art and thus will not be described here.

(Step 105) Determine whether or not the opened or closed facial features exist in the image; if yes, process Step 106, or else return to Step 101 to capture a current image by the digital image capturing device again.

(Step 106) After the position and range of the facial features of the image are marked, the identified range of the facial features is magnified according to a specific proportion such as magnifying the facial features to 1.5 times of the original length and width, and cut a patch of the facial features and their surroundings within a specific range according to the magnified identified range. Since the patch includes the image of the facial features as well as the image of the facial features within a specific range, therefore the facial features show various changes of the facial expressions.

(Step 107) Detect the opened state or closed state of the facial features in the patch (which is the facial expression of the facial features). The facial expression detection is described above, which is designed according to the Adaboost algorithm for training a state classifier by a specific number of opened and closed facial features image samples.

(Step 108) Determine whether or not the facial features in the patch are opened or closed; if the facial features are situated at a closed state, then process Step 109, or else process Step 110.

(Step 109) Issue a warning signal to notice a user of the electronic image capturing device that the facial expressions of the photographed person are not ready for taking a picture, such as the eyes or mouth are closed or the facial expression is unnatural or stiff, and finally return to Step 101.

(Step 110) If the facial expressions of the photographed person are ready for taking pictures, such as a smile face with opened eyes and mouth, then the electronic image capturing device permits the user to press the shutter to capture a portrait photo, and saves the portrait photo into a memory or a storage device of the electronic image capturing device, so as to assure that the facial expressions of the captured portrait photo saved in the electronic image capturing device maintain the best appearance, and finally return to Step 101.

Figure 2:
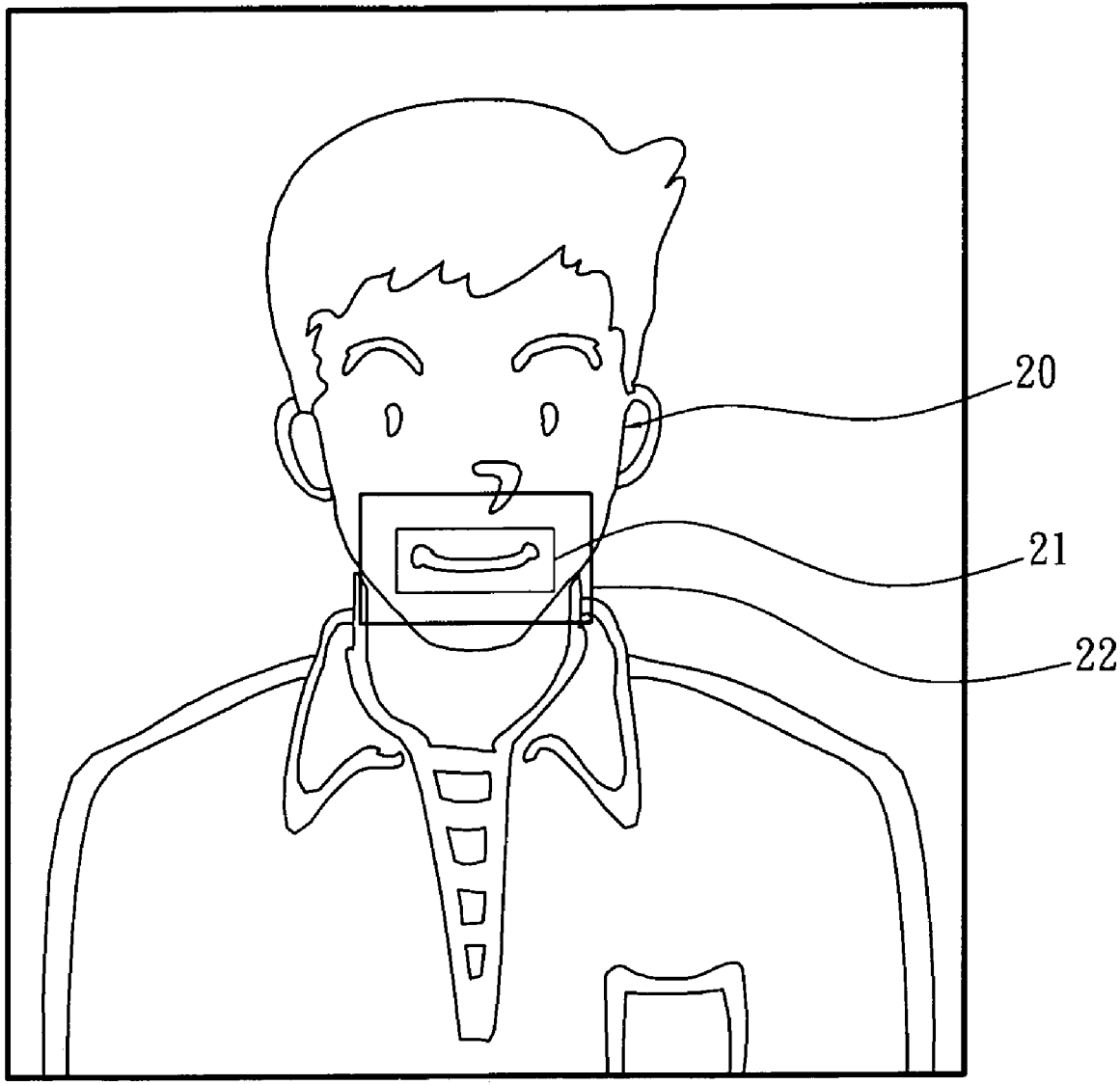
FIG. 2 is a schematic view of detecting a mouth picture in a portrait photo according to the detection method of the present invention.
Figure 3:
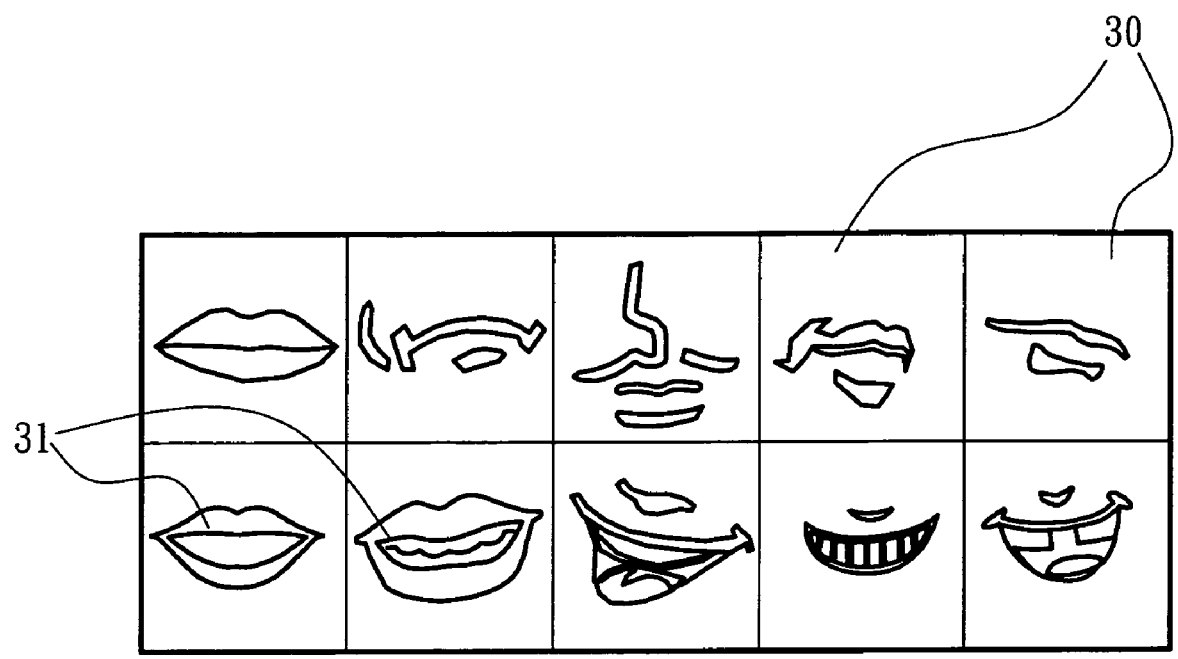
FIG. 3 is a schematic view of using a specific number of opened and closed mouth samples for a portrait photo to train a classifier according to the Adaboost algorithm.

In a preferred embodiment of the present invention, the method performs a face detection to the image captured by the image capturing device. After the position and range of a face in the image are marked, the mouth of the face is detected, and after the position and range of the mouth as shown in a black lined frame 21 of FIG. 2 are identified. The mouth in the identified range is magnified to 1.5 times of its original length and width as shown in a white lined frame 22, and the patch of the mouth and a specific range of its surrounding is cut according to the magnified identified range. A mouth state classifier is used to detect whether the mouth in the patch is at an opened state or a closed state (which shows the facial expression of the mouth), and the mouth state classifier is designed according to the Adaboost algorithm as shown in FIG. 3 and trained by a specific number of closed and opened mouth state samples 30, 31 for determining the opened state of the mouth in the patch correctly. In other words, if the facial expression shows a happy face with an opened mouth, then the electronic image capturing device will be permitted to capture a portrait photo and save the portrait photo.

Figure 4:
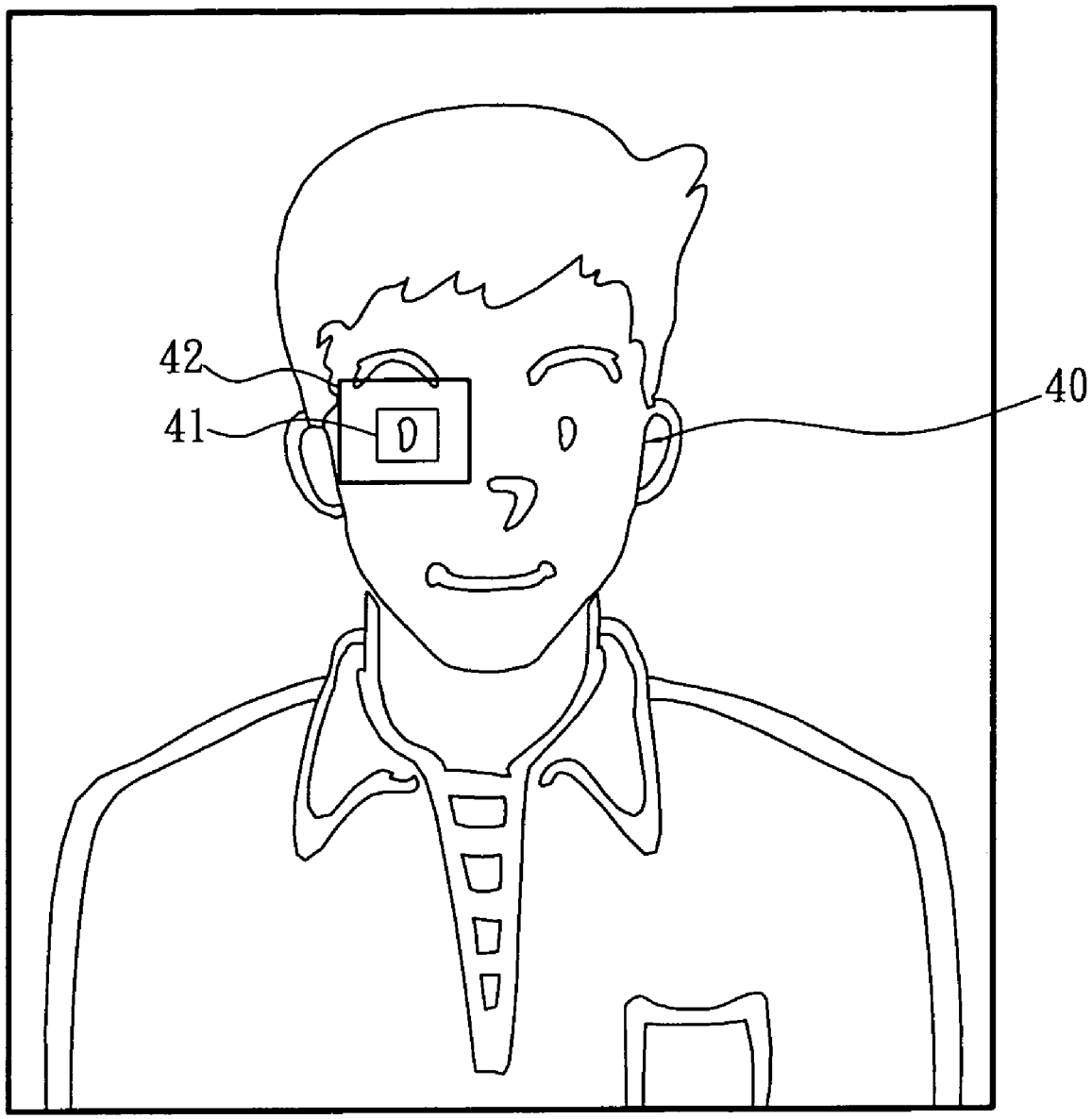
FIG. 4 is a schematic view of detecting an eye picture in a portrait photo according to the detection method of the present invention.
Figure 5:
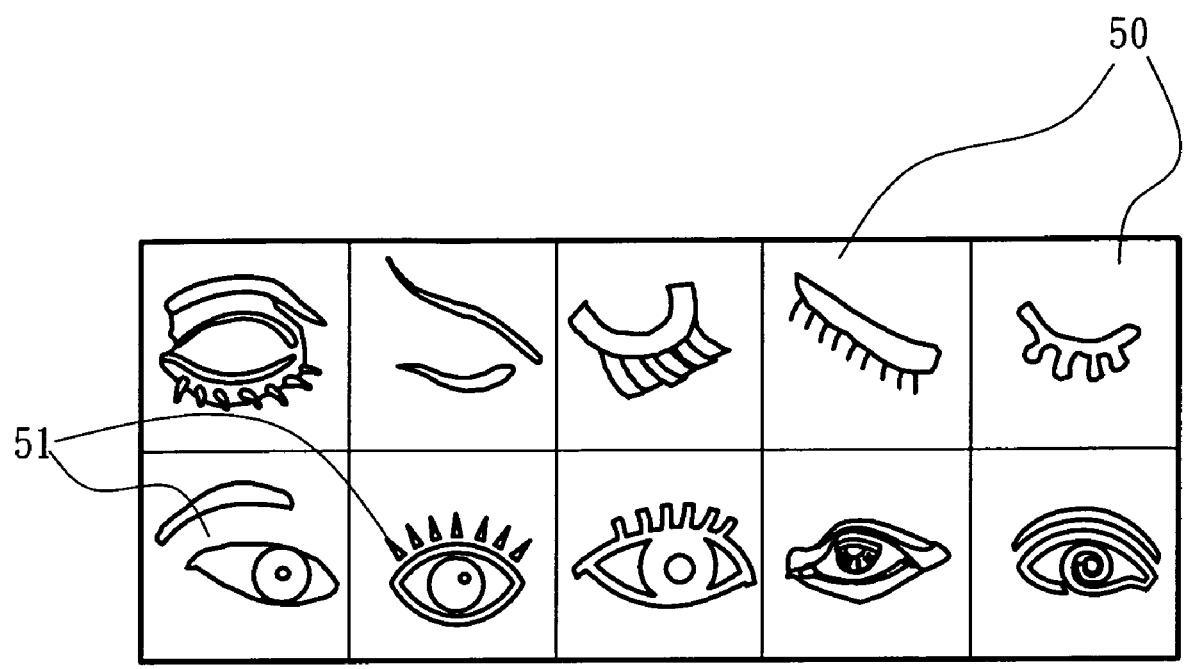
FIG. 5 is a schematic view of training a classifier according to the Adaboost algorithm by using a specific number of opened or closed eye samples of a portrait photo according to the detection method of the present invention.

In another preferred embodiment of the present invention, the method detects the eyes of a face 40 of an image captured by the digital image capturing device. After the position and range of the eyes are identified as shown by a black lined frame 41 in FIG. 4, the identified range of the eyes is magnified to 1.5 times of the original length and width of the eyes as indicated by a white lined frame 42 in FIG. 4. A patch of the eyes and their surroundings within a specific range is cut according to the magnified identified range, and then an eye state classifier is used for detecting the opened state or closed state of the eyes in the patch (which shows the eye state). The eye state classifier could be designed according to the Adaboost algorithm as shown in FIG. 5 and trained by a specific number of closed and opened eye samples 50, 51 for determining the opened state of the eyes in the patch correctly. In other words, if the facial expression shows a happy face with opened eyes, then the electronic image capturing device will be permitted to capture a portrait photo and save the portrait photo, so as to maintain the best appearance.

While the invention herein disclosed has been described by means of specific embodiments, numerous modifications and variations could be made thereto by those skilled in the art without departing from the scope and spirit of the invention set forth in the claims.

What is claimed is:

1. A method for detecting facial expressions of a portrait photo by an image capturing electronic device, being used for an electronic image capturing device, and comprising the steps of:

capturing a current image;

detecting a position and a range of a human face on a portrait photo;

detecting a position and a range of an opened facial feature or a closed facial feature such as an eye or a mouth;

magnifying an identified range of a position of said facial feature according to a predetermined proportion, and cutting said facial feature and a patch within a predetermined surrounding range by said magnified identified range, and said patch being capable of showing a picture with a change of said facial feature and a facial expression in said predetermined surrounding range; and training a facial expression detector by a predetermined number of opened or closed facial feature samples, and detecting an opened state or a closed state of said facial feature in said patch to determine whether or not said facial feature is situated at an opened state or a closed state.

2. The method of claim 1, further comprising a step of issuing a warning signal when said facial feature in said patch is determined to be situated at a closed state.

3. The method of claim 1, further comprising the steps of permitting a user to press a shutter of said electronic image capturing device to capture a portrait photo and saving said portrait photo into a memory or a storage device of said electronic image capturing device, if said facial feature in said patch is determined to be situated at an opened state.

4. The method of claim 1, further comprising a step of capturing a current image if said facial feature does not exist in said image.

5. The method of claim 1, further comprising a step of capturing a current image, if said opened and closed state of facial feature is determined as not existing in said image.

* * * * *